(12) United States Patent
Ahmad et al.

(10) Patent No.: US 9,772,897 B1
(45) Date of Patent: Sep. 26, 2017

(54) METHODS AND SYSTEMS FOR IMPROVING SAFETY OF PROCESSOR SYSTEM

(71) Applicant: Xilinx, Inc., San Jose, CA (US)

(72) Inventors: Sagheer Ahmad, Cupertino, CA (US); Giulio Corradi, Munich (DE)

(73) Assignee: XILINX, INC., San Jose, CA (US)

( * ) Notice: Subject to any disclaimer, the term of this patent is extended or adjusted under 35 U.S.C. 154(b) by 34 days.

(21) Appl. No.: 14/576,771

(22) Filed: Dec. 19, 2014

(51) Int. Cl.
*G06F 11/00* (2006.01)
*G06F 11/07* (2006.01)

(52) U.S. Cl.
CPC ........ *G06F 11/079* (2013.01); *G06F 11/0793* (2013.01)

(58) Field of Classification Search
CPC ........................... G06F 11/079; G06F 11/0793
USPC .................... 714/47.1, 47.2, 47.3, 48, 45
See application file for complete search history.

(56) References Cited

U.S. PATENT DOCUMENTS

| | | | |
|---|---|---|---|
| 3,358,565 A * | 12/1967 | Townsend | B64C 13/24 244/194 |
| 6,078,736 A | 6/2000 | Guccione | |
| 6,557,156 B1 | 4/2003 | Guccione | |
| 7,243,212 B1 | 7/2007 | Purcell et al. | |
| 7,346,759 B1 | 3/2008 | Ansari et al. | |
| 7,546,441 B1 | 6/2009 | Ansari et al. | |
| 7,590,822 B1 | 9/2009 | Purcell et al. | |
| 7,590,823 B1 | 9/2009 | Ansari et al. | |
| 8,296,733 B2 * | 10/2012 | Phillips | G05B 19/056 717/120 |
| 8,595,442 B1 | 11/2013 | James-Roxby et al. | |
| 8,595,561 B1 | 11/2013 | Lu et al. | |
| 8,667,254 B1 | 3/2014 | Rohrer et al. | |
| 8,751,997 B1 | 6/2014 | Gupta | |
| 8,885,334 B1 | 11/2014 | Baxter | |
| 8,937,496 B1 | 1/2015 | Ahmad et al. | |
| 9,038,072 B2 | 5/2015 | Nollet et al. | |
| 9,047,474 B1 | 6/2015 | Ahmad et al. | |
| 9,130,559 B1 | 9/2015 | Ahmad et al. | |
| 9,130,566 B1 | 9/2015 | Ahmad et al. | |
| 9,183,339 B1 | 11/2015 | Shirazi et al. | |
| 9,213,866 B1 | 12/2015 | Ahmad et al. | |
| 9,218,443 B1 | 12/2015 | Styles et al. | |
| 9,304,174 B1 | 4/2016 | Taylor et al. | |
| 2003/0053358 A1 * | 3/2003 | Kundu | G11C 29/40 365/201 |
| 2015/0061630 A1 * | 3/2015 | Xu | H02M 1/32 323/283 |
| 2015/0239086 A1 * | 8/2015 | Lee | B23D 47/00 83/58 |

\* cited by examiner

*Primary Examiner* — Dieu-Minh Le
(74) *Attorney, Agent, or Firm* — Robert M. Brush; Keith Taboada

(57) ABSTRACT

A processing subsystem for providing diagnostic of a processing system is provided. The processing subsystem includes a real-time processing unit that receives a first input that includes data from one or more sensors and processes the first input to generate first output that controls an actuator. The processing subsystem also includes a power and safety management unit that receives a second input and processes the second input to generate second output for testing of the first output. A method and a system for providing diagnostic for a processing system are provided as well.

15 Claims, 6 Drawing Sheets

METHODS AND SYSTEMS FOR IMPROVING SAFETY OF PROCESSOR SYSTEM

TECHNICAL FIELD

Examples of the present disclosure generally relate to execution safety in integrated circuits and, in particular, to methods and systems for improving safety of a processor system.

BACKGROUND

Computer systems often operate with a certain amount of fault tolerance. Faults may occur for a variety of reasons, such as software bugs, hardware bugs, memory bit-flipping due to single event upset ("SEU"), or the like. Many applications are tolerant of such faults for a variety of reasons. However, many other applications require a certain level of safety built into a computer system in order to prevent processing faults from occurring.

Many techniques exist for adding fault tolerance to a computer system to prevent processing faults from occurring or to cause the computer system to take corrective measures when a fault occurs. For example, in one technique, fault tolerance is provided by adding redundant microprocessors that execute identical instructions. If the redundant processors produce inconsistent results, then the computer system detects a fault and may enter a fail-safe mode in which such a fault is corrected and/or the computer system is shut down.

However, adding fault tolerance into a computer system generally involves adding hardware, which adds cost to the computer system. For example, redundant processors require the area cost of additional processors.

As has been shown, what are needed in the art are techniques for improving safety in a computer system.

SUMMARY

A processing subsystem for providing diagnostic of a processing system is provided. The processing subsystem includes a real-time processing unit that receives a first input that includes data from one or more sensors and processes the first input to generate first output that controls an actuator. The processing subsystem also includes a power and safety management unit that receives a second input and processes the second input to generate second output for testing of the first output.

A system is provided that comprises one or more sensors, an actuator, a real-time processing unit, and a power and safety management unit. The real-time processing unit receives a first input that includes data from one or more sensors and processes the first input to generate first output that controls an actuator. The power and safety management unit receives a second input and processes the second input to generate second output for testing of the first output.

A method for providing diagnostic of a processing system is provided. The method includes receiving, by a real-time processing unit, a first input that includes data from one or more sensors. The method also includes processing, by the real-time processing unit, the first input to generate first output that controls an actuator. The method further includes receiving, by a power and safety management unit, a second input. The method also includes processing, by the power and safety management unit, the second input to generate second output for testing of the first output.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting in scope.

To facilitate understanding, identical reference numerals have been used, where possible, to designate identical elements that are common to the figures. It is contemplated that elements of one example may be beneficially incorporated in other examples.

DETAILED DESCRIPTION

Techniques for improving safety of a computing system that includes a power and safety management unit (PMU) are provided. The techniques generally involve configuring the PMU to function in conjunction with a processing system within the computing system in order to provide safety features. The PMU may provide testing functionality for the processing system to form a 1-out-of-1 with diagnostic (1oo1D) configuration. Alternatively, the PMU may accept input that is independent of input accepted by the processing system, and test the output of the processing system based on that independent input to form a 1-out-of-2 (1oo2) configuration. These configurations allow a PMU—a unit that is already present in many computing systems—to provide additional safety functionality to such computing systems.

Figure 1:
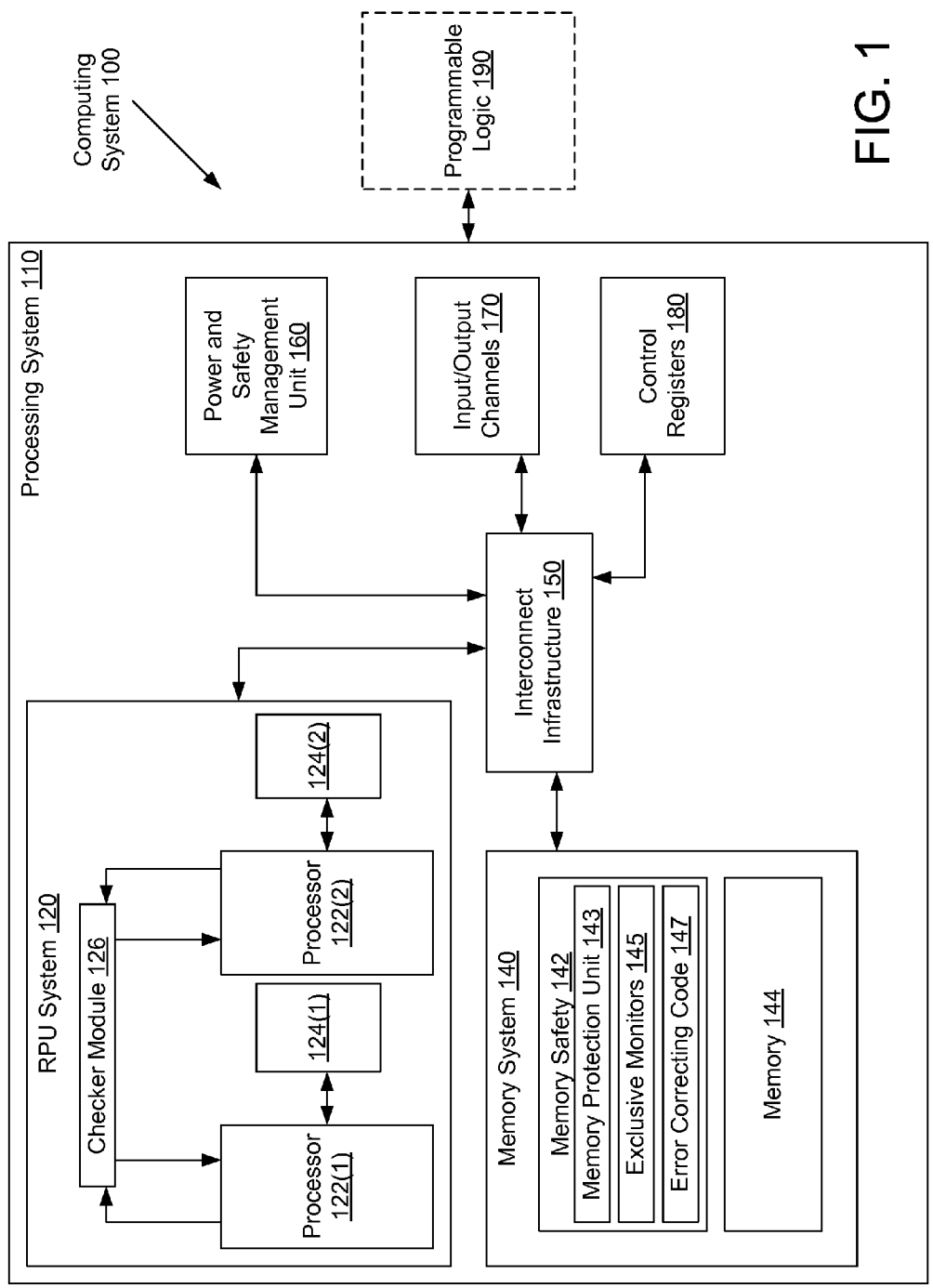
FIG. 1 illustrates a computing system that includes a processing system and, optionally, programmable logic, according to an example.

FIG. 1 illustrates a computing system 100 that includes a processing system 110 and, optionally, programmable logic 190, according to an example. The programmable logic 190 is generally a programmable logic device ("PLD") that includes reconfigurable circuit elements that can be reconfigured to generate various circuit configurations. In one example, the programmable logic 190 includes a large number of different programmable tiles including multi-gigabit transceivers ("MGTs"), configurable logic blocks ("CLBs"), random access memory blocks ("BRAMs"), input/output blocks ("IOBs"), configuration and clocking logic ("CONFIG/CLOCKS"), digital signal processing blocks ("DSPs"), specialized input/output blocks ("I/O") (e.g., configuration ports and clock ports), and other programmable logic such as digital clock managers, analog-to-digital converters, system monitoring logic, and so forth. Optionally, each programmable tile includes a programmable interconnect element ("INT") having standardized connections to and from a corresponding interconnect element in each adjacent tile. The programmable interconnect elements include the connections to and from the programmable logic element within the same tile. The programmable logic 190 may be a field programmable gate array ("FPGA") architecture.

The processing system 110 includes a real-time processing unit system 120 ("RPU system"), a memory system 140, an interconnect infrastructure 150, a power and safety management unit 160 ("PMU"), input/output channels 170, and control registers 180. The RPU system 120 includes multiple processors 122 that are each coupled to a respective tightly coupled memory unit 124. The processor 122 may be any sort of programmable microprocessor and may include components such as caches, co-processors, and the like. The tightly coupled memory units 124 are low latency memory units that are accessible to a respective processor 122, but that do not function like a cache memory. More specifically, the tightly coupled memory units 124 are simply memory spaces that can be read to and written from, but do not store copies of data that are stored in a larger, higher latency memory (such as memory 144). The processors 122 are coupled to a checker module 126.

In operation, each of the processors 122 is configured to execute a single (i.e., the same) sequence of instructions. More specifically, at any point in time both processor 122(1) and processor 122(2) are executing the same sequence of instructions as each other in order to provide redundancy. The checker module 126 tests whether the output of each of the processors 122 matches and if that output does not match, then the checker module 126 signals each of the processors 122 to initiate fault handling. This redundancy of operation adds a level of safety to the processing system 110. More specifically, because multiple processors 122 are executing the same instructions, a fault in any particular processor 122 may be detected by another processor 122 executing the same instructions that produces different results.

The memory system 140 is coupled to the RPU system 120 via interconnect infrastructure 150. During operation, the processors 122 access data stored in memory 144 of the memory system 140. To protect against error, memory system 140 also includes memory safety unit 142. Memory safety unit may include memory safety features such as a memory protection unit, exclusive monitors, and error correcting code (ECC) protection.

A memory protection unit 143 may provide memory protection mechanisms such as enforcement of privilege rules and enforcement of access rules. Privilege rules refers to a scheme whereby different locations in memory are given different privileges. Software that is executing is provided with a particular privilege and can only read from and write to memory locations at or below the assigned privilege. Access rules refer to the ability to prevent or allow certain types of access (e.g., read or write) to particular memory locations.

Exclusive monitors 145 provide exclusivity monitoring to memory locations in the memory 144. More specifically, the exclusive monitors enforce a mechanism whereby each processor 122 is able to access memory locations exclusively. Exclusive memory accesses generally allow a processor 122 to access memory locations without the possibility that another processor has modified that memory location.

Error correcting code protection 147 is a mechanism that protects against single-bit errors in values stored in memory. Certain phenomena, such as cosmic rays, electrical or magnetic interference, or other phenomena may cause a bit for a value stored in memory to be erroneously flipped (i.e., from a 1 to a 0 or from a 0 to a 1). Error correcting code stores a code value (such as parity or a more complex code) that allows the value stored in memory to be checked for accuracy. More specifically, the code value is calculated based on the value stored in memory. If that value is subsequently erroneously changed because of a bit being flipped, then the code value stored may indicate such error and may allow for that error to be corrected.

The memory safety unit 142 thus provides additional safety to the operation of the processing system 110, in addition to the safety provided by the redundant nature of the RPU system 120. This safety allows for values stored in memory to be protected against errors.

Although the safety structures described above exist for providing safety for processing system 110, some components of processing system 110 may not include or be monitored by such safety structures. For example, processing system 110 generally does not have dedicated hardware components that monitor safety for control registers 180. In one example, although ECC protection is present in memory system 140, ECC protection may not be present for the control register 180. (Control registers 180 control various operations of the processing unit, such as clock speed, voltage, and the like). To provide some level of safety for such components of processing system 110 that do not include or are not monitored by safety systems, processors 122 can be programmed, via software, to monitor such various components. In one technique, the processor 122 maintains, in memory 144, a copy of the values stored in the control registers 180. Because memory 144 is monitored for safety by memory safety unit 142, the values of the control registers are effectively monitored for safety. However, monitoring the unmonitored hardware components of processing system 110 with software executing in processors 122 increases the workload experienced by the processors 122, thus reducing the amount of processing power available for other processing tasks.

Thus, techniques are provided herein for increasing the safety monitoring abilities of processing system 110 without significant additional processing overhead experienced by the RPU system 120. More specifically, techniques are provided herein for configuring the PMU 160 to function in conjunction with the RPU system 120 for providing the additional safety monitoring abilities. These techniques are described in a situation where computing system 100 is used to process data received from one or more sensors (described below) to generate output to control one or more actuators (also described below).

The PMU 160 is generally a hardware unit that has direct hardware connections to various functional units in the computing system 100. The PMU 160 may include a microcontroller that is programmed to perform various monitoring functions. In various examples, the PMU 160 has direct hardware connections to various portions of the computer system 100, where those direct hardware connections provide functionality to monitor power connections and battery charge, to control power to various portions of the computing system 100, to shut down unused system components when those system components are idle, to control sleep and power functions of the computing system 100, to manage interface for various input/output devices such as keypads and trackpads, and to manage a real-time clock (which keeps track of the current time). In various examples, the PMU 160 is programmed to continuously monitor these and other functions of the computing system 100.

This PMU 160, which otherwise is programmed to perform the above-mentioned testing and monitoring functions, may be programmed to also perform safety operations. More specifically, the PMU 160 may be used to create one of several different safety configurations. In one safety configuration, termed 1-out-of-1 (or "1oo1"), the processing system 110 functions normally, except that the PMU 160 performs safety monitoring tasks that would otherwise be performed by the RPU system 120 with software. In another safety configuration, termed 1-out-of-1-with-diagnostic (or "1oo1D"), the processing system 110 functions normally and the PMU 160 is programmed to act as a "diagnostic channel" that performs diagnostic checks on the algorithmic results of the RPU system 120. The diagnostic check generally comprises a check to test that the RPU system 120 is acting as desired. In one example, the diagnostic check comprises a computationally less intensive but algorithmically similar computation as performed by the RPU system 120. For example, the diagnostic check may consume fewer processor clock cycles, may require fewer instructions to process, may process a smaller amount of data, or may perform an algorithm that has less complexity according to the big-O notation measure of classifying algorithms. In yet another safety configuration, termed 1-out-of-2 (or "1oo2"), the processing system 110 and PMU 160 are both programmed to perform computations based on input from one or more input sensors and to generate commands for output to a voter. The voter compares the commands for consistency. If consistent, then the voter controls actuators according to the commands. If inconsistent, then the voter causes the RPU system 120 and PMU 160 to enter a fail-safe mode.

The 1oo2 configuration includes multiple sensors, where one set of sensors is coupled to the RPU system 120 and the other set of sensors is coupled to the PMU 160. The two sets of sensors may overlap (i.e., have at least one sensor in common). The different sets of sensors, while different, are generally configured to measure aspects of the same target subject. Further, the RPU system 120 and PMU 160 each perform computations that are different but that produce a similar type of result. In one example, a first sensor coupled to the RPU 120 is a video camera and the RPU 120 is configured to calculate whether an object is present in the field of view of the video camera based on the video camera input, while a second sensor coupled to the PMU 160 is a radar sensor and the PMU 160 is configured to calculate whether an object is present based on the radar sensor input. A voter compares the results from the RPU 120 and PMU 160 to determine whether there is any difference. If a difference occurs, then the processing system 110 may remedy that difference by entering a fail-safe mode or by taking other appropriate action. The 1oo1, 1oo1D, and 1oo2 configurations are discussed in greater detail below.

Figure 2:
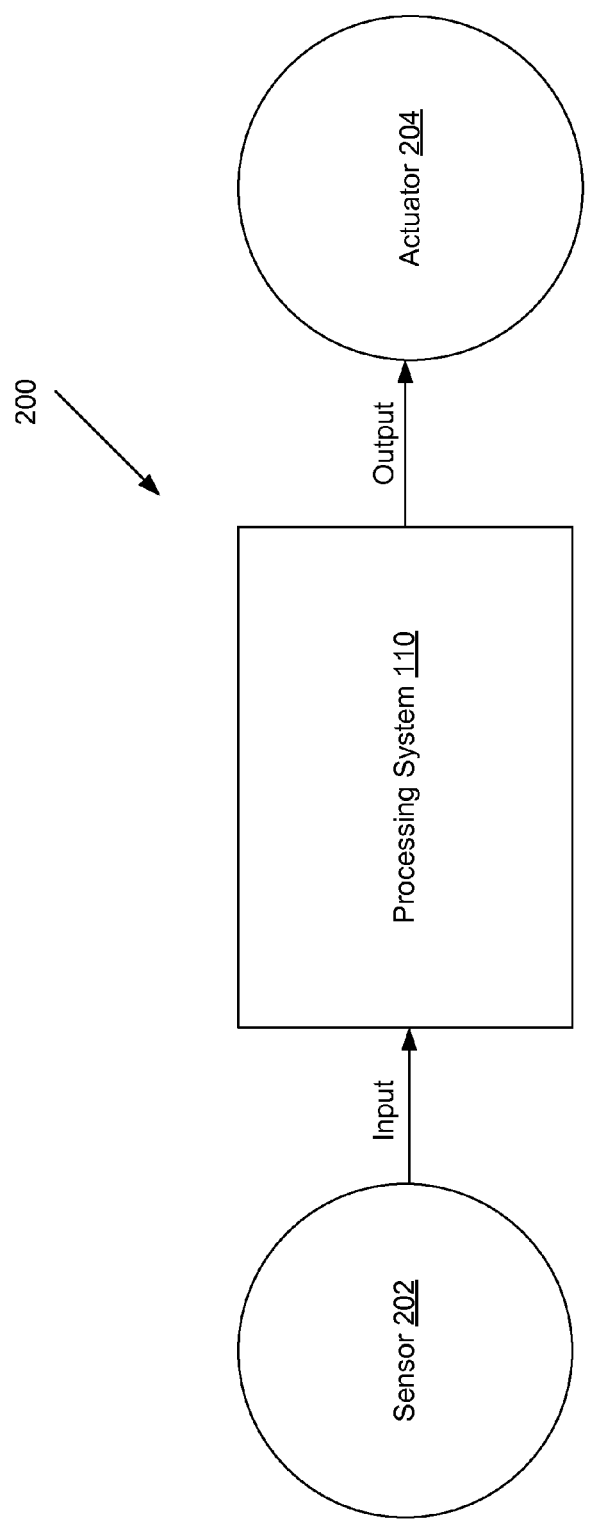
FIG. 2 is a conceptual illustration of a 1-out-of-1 (1oo1) safety configuration configured from the computing system of FIG. 1, according to an example.

FIG. 2 is a conceptual illustration of a 1oo1 safety configuration 200, configured from the computing system 100 of FIG. 1, according to an example. In the 1oo1 safety configuration 200, the processing system 110 receives input from a sensor 202. The sensor 202 can be any type of sensor or combination of sensors. Some examples of sensors include a video camera, a radar, and an audio sensor. The processing system 110 receives sensor data (also referred to herein as "input data") from the sensor 202, processes the sensor data, and provides an output to an actuator 204. The actuator 204 responds according to the output. In one example, the sensor 202 is a video camera, the processing system 110 is programmed to perform object recognition, and the actuator 204 is an automobile brake control. If the object recognition detects an object, the processing system 110 causes the break control to brake.

In the 1oo1 configuration 200, the processing system 110 includes the elements illustrated in FIG. 1. Thus, the processing system 110 includes the RPU system 120, the memory system 140, and the PMU 160. As described above with respect to FIG. 1, each of these elements includes some level of safety. Briefly, the RPU system 120 includes the above-described execution redundancy and the memory 140 includes the above-described memory safety 142. As also described above, the PMU 160 is configured to perform certain testing operations that would otherwise be performed by the RPU 120. For example, the PMU 160 may be programmed to maintain copies of the values stored in the control registers 180 and periodically check the values stored in the control registers 180 against the stored copy values. Thus, the 1oo1 configuration 200 includes some level of safety—that is, the safety that is built into the various components of the processing system 110. The 1oo1D configuration and 1oo2 configuration, described below, include additional safety measures that provide extra safety.

Figure 3:
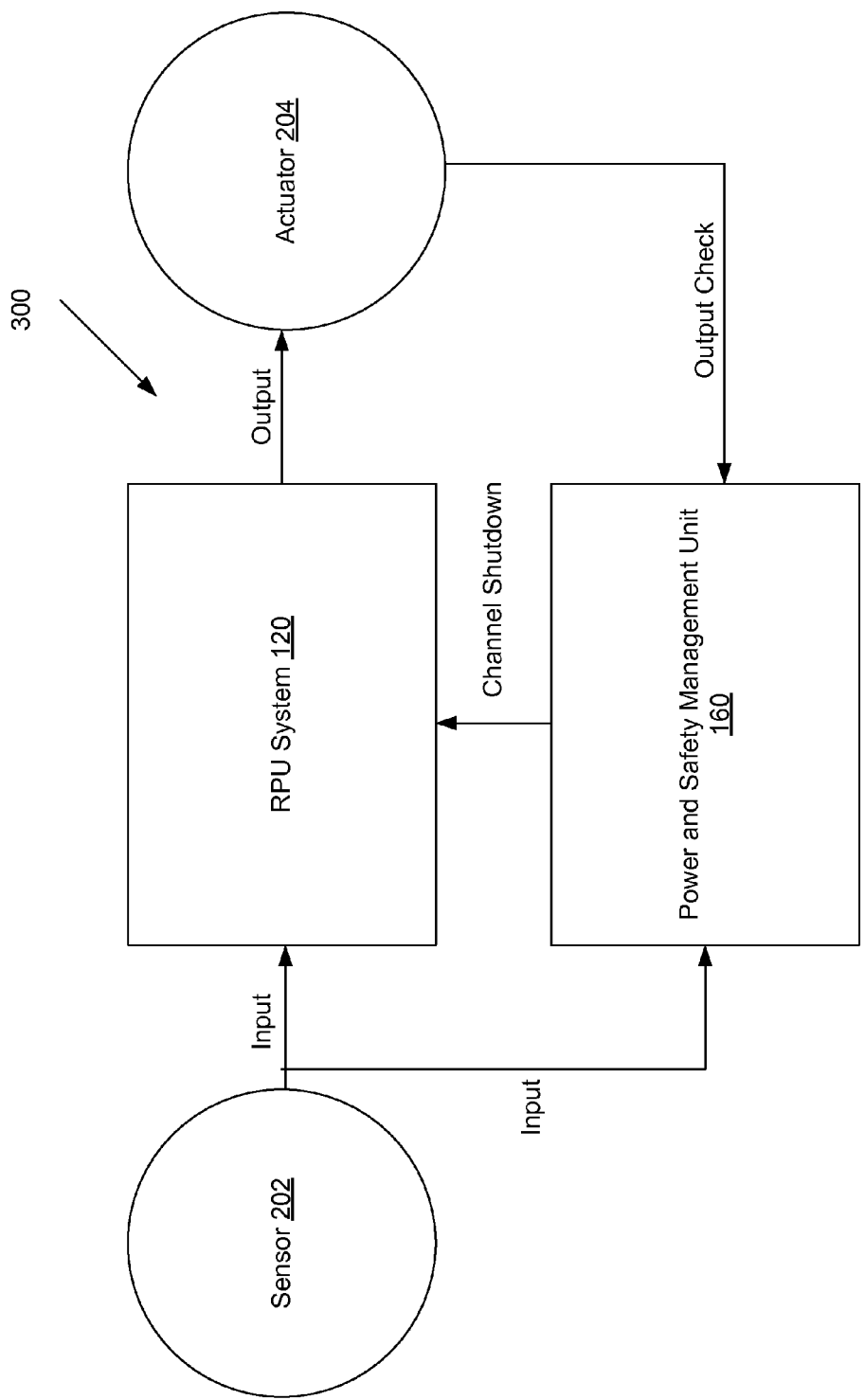
FIG. 3 is a conceptual illustration of a 1-out-of-1 with diagnostic (1oo1D) safety configuration, configured from the computing system 100 of FIG. 1, according to an example.

FIG. 3 is a conceptual illustration of a 1oo1D safety configuration 300, configured from the computing system 100 of FIG. 1, according to an example. In the 1oo1D safety configuration 300, the processing system 110 receives input from a sensor 202. As with the 1oo1 safety configuration 200 described above, the sensor 202 may include any type of sensor or combination of sensors. Within the processing system 110, both the RPU system 120 and the PMU 160 receive input from the sensor 202. The RPU system 120 performs certain operations based on input received from the sensor 202 and provides output to an actuator 204. As above, the actuator 204 may be any system or combination of systems that performs an action in response to the output received from the RPU 120. The actuator 204 may include, for example, a display element (a light, a display screen), an audio output element (e.g., an alarm), a mechanical actuator (e.g., a motor), a communicator (e.g., a radio transmitter or the like), or any of a variety of different systems or elements that respond to the output provided by the RPU 120.

The PMU 160 also receives input from the sensor 202, as well as an input from the actuator 204, and performs certain safety algorithms to test that the RPU 120 and actuator 204 are operating within desirable parameters. If the PMU 160 determines that the actuator 204 is operating outside of such desirable parameters, then the PMU 160 causes the RPU 120 to operate in a fail-safe mode. The fail-safe mode is a mode in which the RPU 120 causes the actuator 204 to perform certain operations to transfer a system that the processing system 110 is controlling to a "safe" mode. A safe mode is a mode in which such system is less vulnerable to processing errors by the RPU 120, but in which such system has a reduced functionality than a "prescribed" functionality. In one example, the system is a vehicle and a safe mode is a mode in which the vehicle is stopped. In another example, the system includes a rotor controlled by the actuator 204 and the safe mode is a mode in which the rotor is not moving.

Configuring the PMU 160, which is already present in many computer chip systems, to provide a diagnostic channel for a main processing system provides an additional level of safety to a processing system (i.e., the RPU 120) that may already include certain safety features. Further, because the PMU 160 is already present in many computer chip systems, no additional hardware needs to be added to such systems in order to provide such a diagnostic channel. Additionally, the diagnostic channel provides a diversity of testing. "Diversity" refers to the fact that multiple independent processing systems are analyzing the input information in order to generate meaningful results. For example, these multiple independent processing systems execute different software with different hardware.

Figure 4:
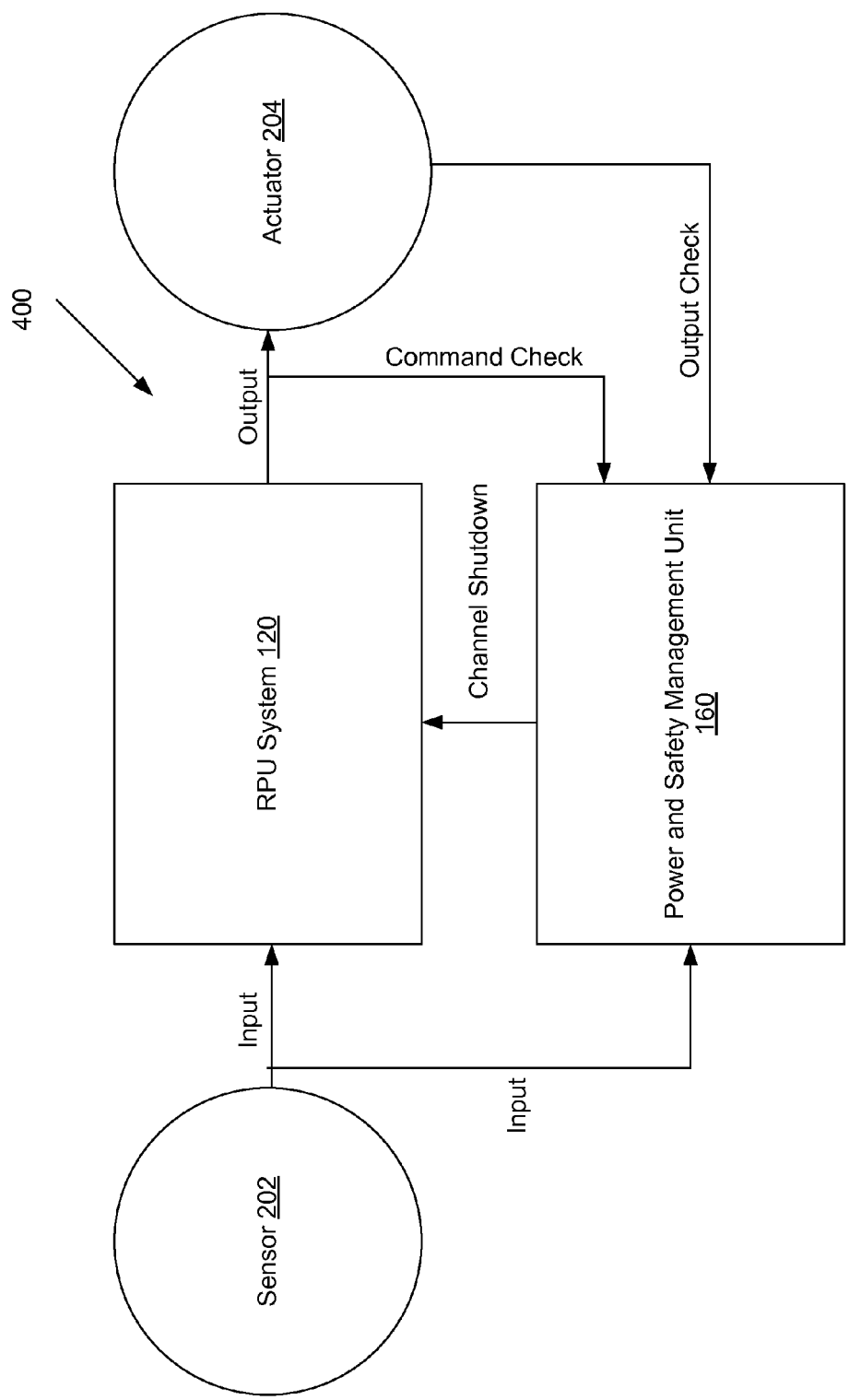
FIG. 4 is a conceptual illustration of a 1oo1D safety configuration, configured from the computing system of FIG. 1, with command check functionality, according to an example.

FIG. 4 is a conceptual illustration of a 1oo1D safety configuration 400, configured from the computing system 100 of FIG. 1, with command check functionality. The 1oo1D safety configuration 400 is similar to the 1oo1D safety configuration 300 except that in addition to receiving the input from the sensor 202 and the output from the actuator 204, the PMU 160 also receives the output from the RPU system 120, which, as described above, includes commands that that the RPU system 120 provides to activate the actuator 204. The PMU 160 in FIG. 4 is configured similarly to the PMU 160 in FIG. 3 except that the PMU 160 in FIG. 4 additionally processes the commands output from the RPU 120 to determine whether such commands are "as expected." More specifically, the PMU 160 in FIG. 4 is configured to process the input received from the sensor 202 in order to determine whether the commands output by the RPU system 120 are as expected based on the input received from the sensor 202.

The 1oo1D configuration 400 may be used for a wide variety of purposes. One example use is now provided. The 1oo1D configuration 400 may be used to monitor and enforce safe operation of an electrical motor that drives a driveshaft. More specifically, in the 1oo1D configuration 400, the RPU 120 is configured to provide actuation commands to the electrical motor in order to control the drive shaft. The RPU 120 may base these commands on the current drive shaft angle, received from a sensor (acting as sensor 202) that measures that angle. The PMU 160 is configured to perform diagnostic checks on the operation of the driveshaft in order to operate the driveshaft in a "safe torque off" mode. More specifically, the PMU 160 is configured to monitor the commands output from the RPU 120 and the current being drawn by the motor (as output from the actuator 204). The PMU 160 is configured to detect whether the torque being applied by the motor onto the drive shaft is above a particular threshold and to shut down the RPU 120 if the torque is above that threshold. Because the PMU 160 acts on different sets of input than the RPU 120, the PMU 160 provides a level of diversity as compared with the RPU 120.

In the 1oo1D configurations described above, the PMU 160 may receive and act on any of the input from the sensors 202, commands that are output from the RPU system 120 or output received from the actuator 204.

Figure 5:
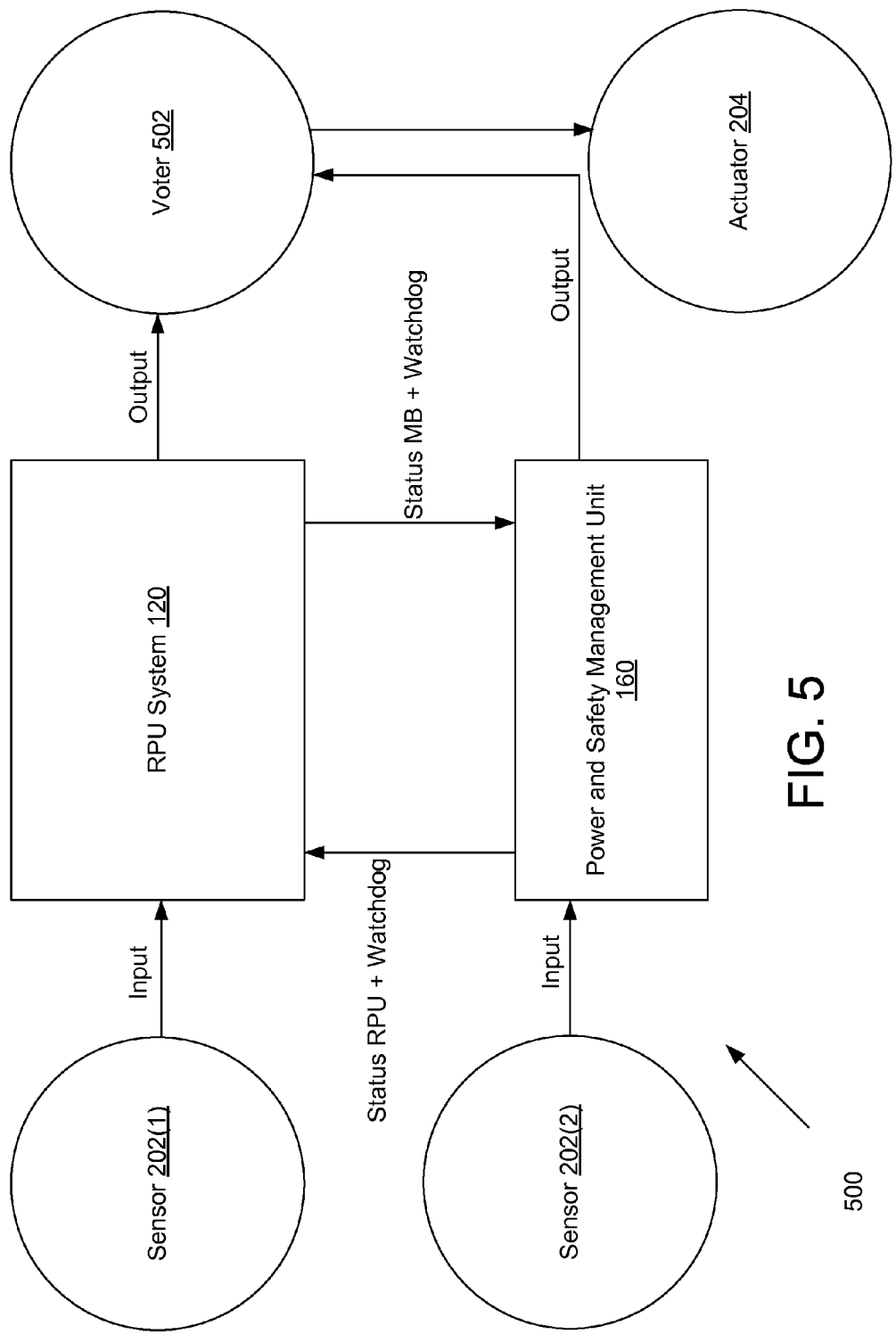
FIG. 5 is a conceptual illustration of a 1-out-of-2 safety configuration, configured from the computing system of FIG. 1, according to an example.

FIG. 5 is a conceptual illustration of a 1oo2 safety configuration 500, configured from the computing system 100 of FIG. 1, according to an example. In the 1oo2 safety configuration 500, the RPU 120 receives input from a first sensor 202(1) and the PMU 160 receives input from a second sensor 202(2). Both sensor 202(1) and sensor 202(2) may include any type of sensor or combination of sensors. Preferably, sensor 202(1) is of a different type than sensor 202(2) so that RPU system 120 processes information that is different from the information processed by the PMU 160. This type of differentiation in sensor 202 and information type provides a redundancy with diversity, which improves the level of redundancy of the 1oo2 system 500. More specifically, because the PMU 160 processes information that is different from the information processed by the RPU 120, the combination of the PMU 160 and the RPU 120 has a lower chance of failure than without such diversity.

In addition, instead of the RPU 120 directly controlling an actuator as with FIGS. 2-4, both the RPU 120 and the PMU 160 provide output to a voter 502. The voter 502 determines whether the output provided by both the RPU 120 and the PMU 160 is consistent. If the output is consistent, then the voter 502 provides that output to the actuator 202 to cause the actuator to act according to that output. If the output is not consistent, then either or both of the RPU 120 or PMU 160 enter a fail-safe mode in which the RPU 120 and/or PMU 160 cause the actuator to place the system controlled by the actuator in a fail-safe mode.

The different sensors 202 are configured to provide different types of information from a single target subject. In one example, a first sensor 202(1) may provide video output (visible electromagnetic radiation) and a second sensor 202(2) may provide radar output. The RPU 120 and PMU 160 would perform appropriate processing in order to, for example, detect presence of an object based on the input received from the first sensor 202(1) and second sensor 202(2), respectively. In other examples, the first sensor 202(1) and second sensor 202(2) may be video cameras of different types (e.g., made by different manufacturers, having different resolution, having different color-depth, or the like), or may be other differently-typed sensors that sense different aspects of a particular target subject.

Both the RPU 120 and the PMU 160 receive status information from each other. More specifically, the RPU 120 receives status information from the PMU 160 and the PMU 160 receives status information from the RPU 120. If either the RPU 120 or the PMU 160 detects a malfunction from the other, then the RPU 120 or PMU 160 enters a fail-safe mode. In the fail-safe mode, one unit (i.e., the RPU 120 or PMU 160) causes the other unit (i.e., RPU 120 or PMU 160) to enter the fail-safe mode and also transmits commands to the actuator 204 to cause the system controlled by the actuator 204 to enter a fail-safe mode.

The 1oo2 configuration 500 may be used for a wide variety of purposes. One example use is now provided. The 1oo2 configuration 500 may be used to control a vehicle such as a train. More specifically, the RPU 120 may receive input from sensors that measure the speed of the train, sensors that measure the status of doors, stored data that includes information about an expected schedule, sensors that indicate the current train position, an odometer, sensors that include telemetry information, and data storing the sequence of driver commands. Both the RPU 120 and the PMU 160 receive information from these sensors through two different communication channels in order to provide diversity. Both the RPU 120 and PMU 160 execute software to test that the information received from the sensors indicates that the train is operating safely. If either the RPU 120 or the PMU 160 detects an anomaly, the RPU 120 or PMU 160 sends an indication of the anomaly to the voting unit 502. The voting unit 502 causes actuators to take certain actions if the voting unit 502 determines that the RPU 120 and PMU 160 input indicates that the existence of an anomaly is sufficiently certain.

Figure 6:
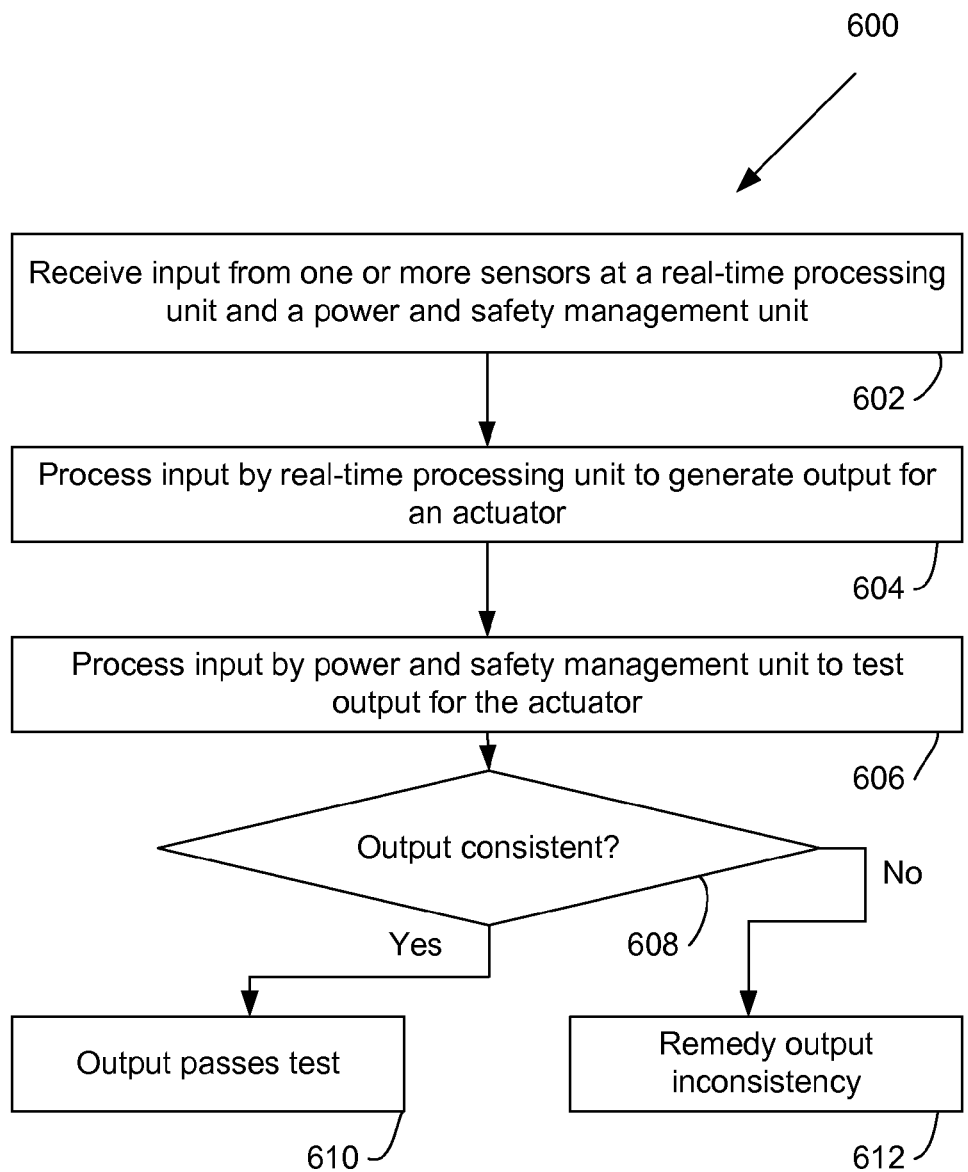
FIG. 6 is a flow chart of method steps for operating a processing system in a 1oo1D safety configuration, according to an example.

FIG. 6 is a flow chart of method steps for operating a processing system in a 1oo1D safety configuration 300, according to an example. Although the method steps are described in conjunction with FIGS. 1 and 3-5, persons skilled in the art will understand that any system configured to perform the method steps, in various alternative orders, falls within the scope of the present disclosure.

As shown, a method 600 begins at step 602, at which the RPU 120 and the PMU 160 receive input from one or more sensors 202. In a 1oo1D configuration, the RPU 120 and PMU 160 receive the same input from the same sensor 202. In a 1oo2 configuration, the RPU 120 receives input from a first sensor 202(1) and a PMU 160 receives input from a second sensor 202(2) that may be different in type than the first sensor 202(1). At step 604, the RPU 120 processes received input to generate output for an actuator 204. At step 606, the PMU 160 processes received input to test output for the actuator. At step 608, if the output is consistent, then the method proceeds to step 610, at which the output is tested. At step 608, if the output is not consistent, then the method proceeds to step 612, in which the inconsistent output is remedied.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific example implementations, other and further example implementations may be devised without departing from the basic scope thereof, and the scope thereof is determined by the claims that follow.

What is claimed is:

1. A processing subsystem for providing diagnostic of a processing system in an integrated circuit (IC), the processing subsystem comprising:
   a real-time processing unit disposed in the IC and including a plurality of microprocessors each executing the same set of instructions and configured to:
      receive a first input that includes data from one or more sensors, and
      process the first input to generate first output configured to control an actuator; and
   a power and safety management unit disposed in the IC and including a microcontroller configured to:
      receive a second input, and
      process the second input to generate second output for testing of the first output;
   wherein the second input includes one or more of the first input, the first output, and a feedback received from the actuator;
   wherein the power and safety management unit further:
      detects an anomaly based on the second input; and
      shuts down the real-time processing unit in response to detecting the anomaly,
      wherein the anomaly indicates that the first output provided by the real-time processing unit produces effects deemed to be undesirable in the actuator.

2. The processing subsystem of claim 1, wherein the power and safety management unit further:
   executes a diagnostic algorithm that is computationally less intensive than a main algorithm executed by the real-time processing unit.

3. The processing subsystem of claim 1, wherein:
   the second output includes commands to control operation of the real-time processing unit.

4. The processing subsystem of claim 1, wherein:
   the second input includes data from one or more sensors that produces data not included in the one or more sensors from which the first input is received.

5. The processing subsystem of claim 4, wherein:
   both the first output and the second output include commands to control the actuator.

6. The processing subsystem of claim 5, further comprising:
   a voting unit that:
      receives the first output and the second output, and
      based on the first output and the second output, provides a third output to the actuator.

7. The processing subsystem of claim 1, further comprising:
   programmable logic that includes reconfigurable circuit elements that can be configured to generate various circuit configurations.

8. A system, comprising:
   one or more sensors;
   an actuator;
   a real-time processing unit disposed in an integrated circuit (IC) and including a plurality of microprocessors each executing the same set of instructions and configured to:
      receiver a first input that includes data from the one or more sensors, and
      process the first input to generate first output configured to control the actuator; and
   a power and safety management unit disposed in the IC and including a microcontroller configured to:
      receive a second input, and process the second input to generate second output for testing of the first output;
wherein the second input includes one or more of the first input, the first output, and a feedback received from the actuator;
wherein the power and safety management unit further:
  detects an anomaly based on the second input; and
  shuts down the real-time processing unit in response to detecting the anomaly,
  wherein the anomaly indicates that the first output provided by the real-time processing unit produces effects deemed to be undesirable in the actuator.

9. The system of claim 8, wherein the power and safety management unit further:
executes a testing algorithm that is computationally less intensive than a main algorithm executed by the real-time processing unit.

10. The system of claim 8, wherein:
the second output includes commands to control operation of the real-time processing unit.

11. The system of claim 8, wherein:
the second input includes data from one or more sensors that produces data not included in the one or more sensors from which the first input is received.

12. The system of claim 11, wherein:
both the first output and the second output include commands to control the actuator.

13. The system of claim 12, further comprising:
a voting unit that:
  receives the first output and the second output, and based on the first output and the second output, provides a third output to the actuator.

14. The system of claim 8, further comprising:
programmable logic that includes reconfigurable circuit elements that can be configured to generate various circuit configurations.

15. A method for providing diagnostic of a processing system in an integrated circuit (IC), the method comprising:
receiving, by a real-time processing unit disposed in the IC and including a plurality of microprocessors each executing the same set of instructions, a first input that includes data from one or more sensors;
processing, by the real-time processing unit, the first input to generate first output configured to control an actuator;
receiving, by a power and safety management unit, a second input;
processing, by the power and safety management unit disposed in the IC and including a microcontroller, the second input to generate second output for testing of the first output;
detecting an anomaly based on the second input; and
shutting down the real-time processing unit in response to detecting the anomaly;
wherein the anomaly indicates that the first output provided by the real-time processing unit produces effects deemed to be undesirable in the actuator.

* * * * *